United States Patent [19]

Miller et al.

[11] Patent Number: 5,808,374
[45] Date of Patent: Sep. 15, 1998

[54] DRIVER INTERFACE SYSTEM FOR VEHICLE CONTROL PARAMETERS AND EASY TO UTILIZE SWITCHES

[75] Inventors: Robin Mihekun Miller, Ellington, Conn.; Hollister Hartman, Northville, Mich.

[73] Assignee: UT Automotive Dearborn, Inc., Dearborn, Mich.

[21] Appl. No.: 823,725

[22] Filed: Mar. 25, 1997

[51] Int. Cl.⁶ ..................................................... B60R 1/00
[52] U.S. Cl. ........................ 307/10.1; 307/9.1; 307/10.7; 307/10.8; 340/461; 340/825.34; 340/825.69; 340/825.72; 701/36; 701/45; 701/49; 200/61.54; 200/61.57
[58] Field of Search .................................... 307/9.1, 10.1, 307/10.6, 10.7, 10.8, 38; 340/438, 439, 441, 442, 449, 450, 451, 455, 457, 458, 461, 462, 525, 825.3, 825.31, 825.32, 825.34, 825.54, 825.69, 825.72, 459, 457.1, 457.2, 457.3, 457.4; 364/423.098, 423.099, 424.013, 424.034, 424.037, 424.045, 424.047, 424.055, 424.059; 200/61.54, 61.57; 318/603, 466–468, 568.1; 315/76, 77, 84

[56] References Cited

U.S. PATENT DOCUMENTS

| | | | |
|---|---|---|---|
| 1,389,366 | 8/1921 | Loder | 200/61.57 |
| 1,500,191 | 7/1924 | Herbert | 200/61.57 |
| 4,451,887 | 5/1984 | Harada et al. | 318/466 |
| 4,477,874 | 10/1984 | Ikuta et al. | 307/10.1 |
| 4,707,788 | 11/1987 | Tashiro et al. | 318/466 |
| 4,731,769 | 3/1988 | Schaefer et al. | 364/424 |
| 4,809,180 | 2/1989 | Saitoh | 318/466 |
| 4,853,687 | 8/1989 | Isomura et al. | 340/825.31 |
| 5,019,759 | 5/1991 | Takemura et al. | 307/10.1 |
| 5,028,808 | 7/1991 | Sullivan et al. | 307/122 |
| 5,712,625 | 1/1998 | Murphy | 340/825.31 |

*Primary Examiner*—Jeffrey A. Gaffin
*Assistant Examiner*—Peter Ganjian
*Attorney, Agent, or Firm*—Howard & Howard

[57] ABSTRACT

An improved driver interface system provides prompts to an operator to adjust several vehicle parameters. In this way, the operator is assured to adjust the necessary components upon start up of the vehicle. This is particularly important when the driver is unfamiliar with the car, as with a rental car. In one embodiment, the driver may be provided with a transmitter that stores desired settings for at least some parameters. The transmitter can then transmit the operator's desired parameters to a control, and the vehicle components can then begin to be moved to the desired positions as the operator approaches the vehicle. In other aspects of this invention, improved switches are disclosed. A rotary switch rotates on a steering wheel rim. This switch is easily accessible to an operator, and does not require the operator to divert attention from the road. A second type switch includes an element which is sensitive to touch by the operator. In this way, the operator can easily set a desired level by simply touching the switch. This type switch has particular benefits in cruise control systems, or in systems for positioning vehicle components such as windows.

18 Claims, 2 Drawing Sheets

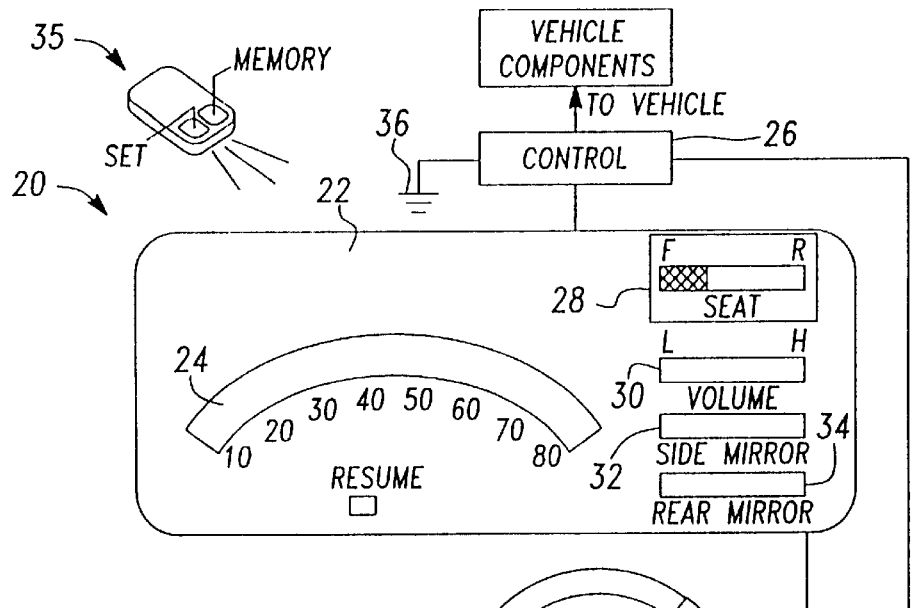
*Fig-1A*
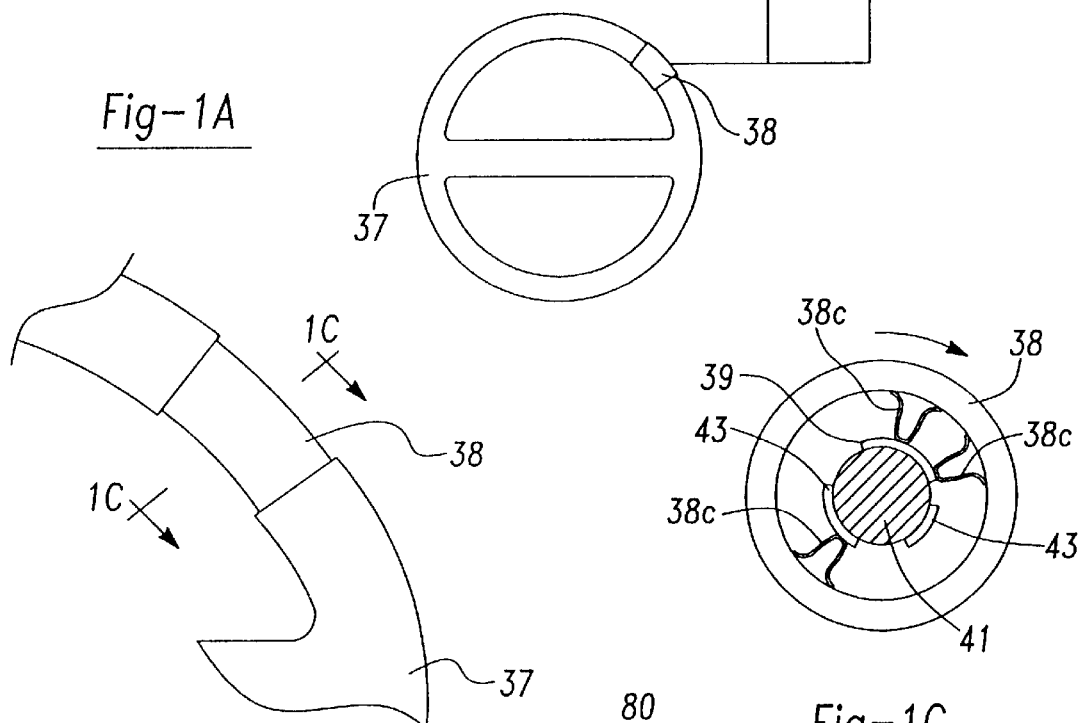
*Fig-1B*
*Fig-1C*
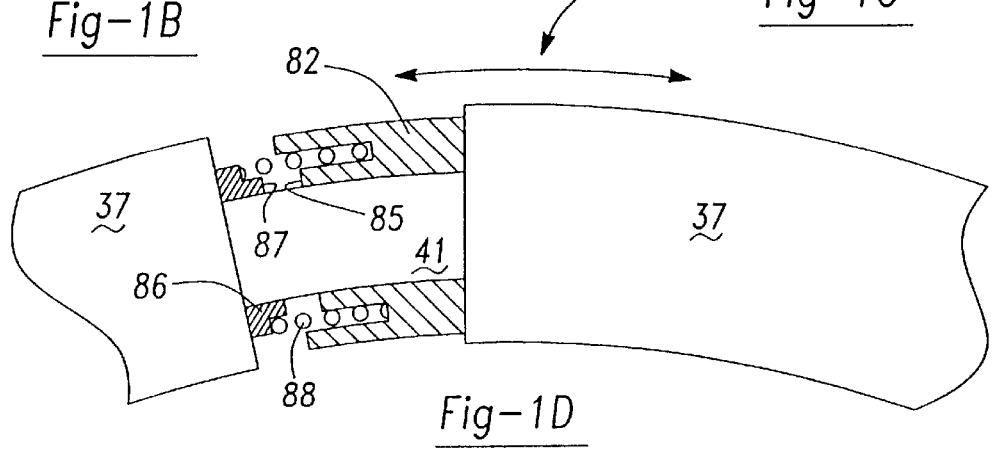
*Fig-1D*

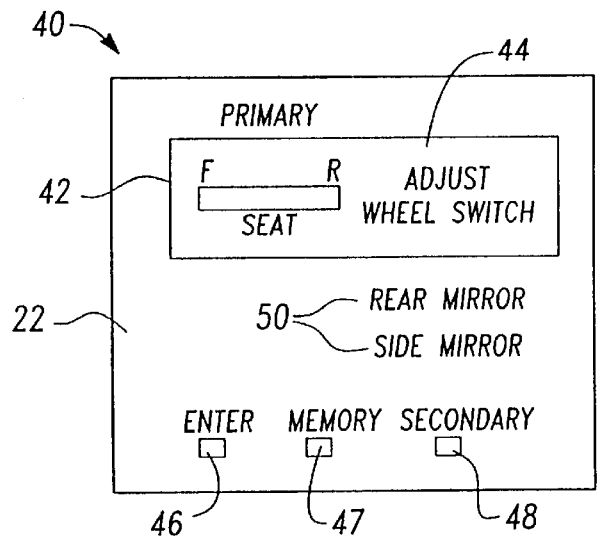
Fig-2A
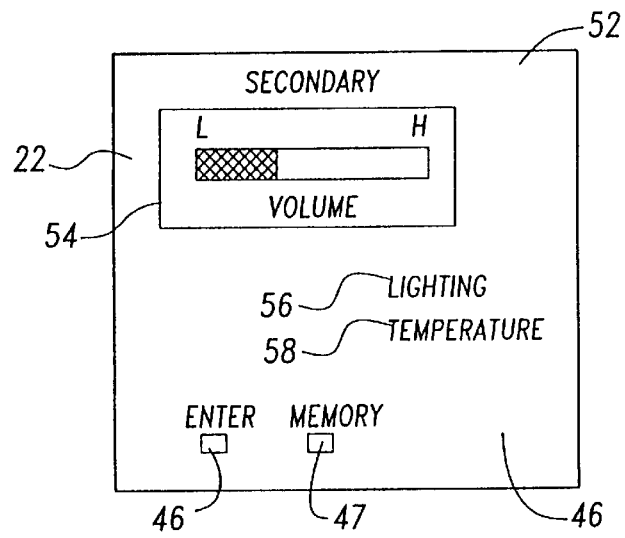
Fig-2B
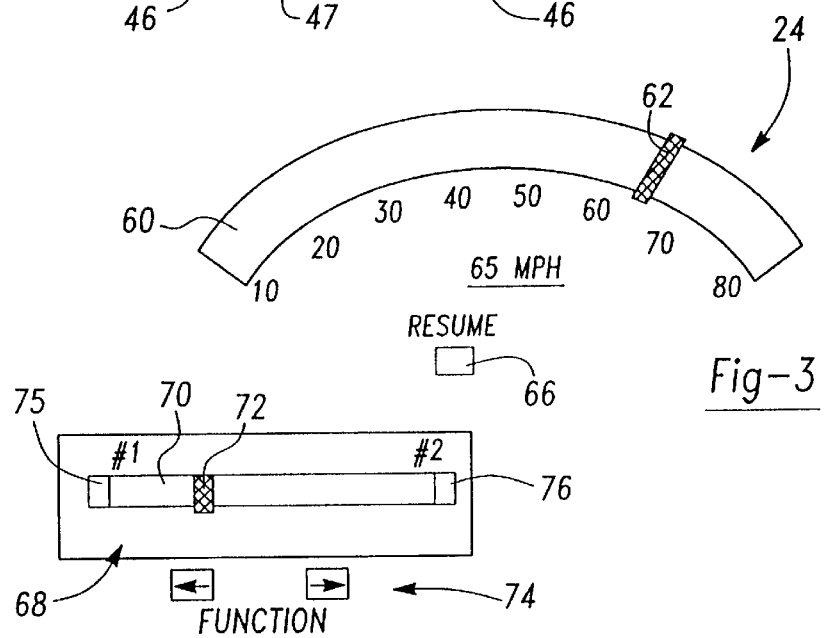
Fig-3
Fig-4

DRIVER INTERFACE SYSTEM FOR VEHICLE CONTROL PARAMETERS AND EASY TO UTILIZE SWITCHES

BACKGROUND OF THE INVENTION

This invention relates to a vehicle interface system for prompting a driver to set vehicle control parameters to those preferred by an individual driver. In addition, specific switches are disclosed which are easier to utilize than existing switches.

In the prior art, vehicles are being provided with more and more control features. Thus, many vehicle control parameters are moveable to various positions, or adjustable to various levels, for accommodating a particular driver. As an example, the position of the mirrors, the seats, the steering wheel, etc. may all be tailored to a particular driver. The level of other parameters, such as temperature, lighting, audio level are also adjustable. Some vehicles are now provided with the ability to move to memory positions tailored to an individual operator for some parameters.

Problems exist, however, in that a driver first entering a vehicle may not remember to adjust each of the parameters to desired positions before beginning to operate the vehicle. As an example a driver may drive a rental car a number of miles before recognizing that the position of the mirrors is not as desired. This is potentially a safety hazard. In addition, it is somewhat time consuming for an operator to move each of the parameters to a desired location or level upon entering a new vehicle.

The known memory locations set within a vehicle are typically actuated by a switch within the vehicle. Thus, the operator must have typically entered the vehicle before the components begin to move to the memory positions. If two drivers who frequently use the same vehicle are at extremes in height, it could be difficult when the taller driver attempts to enter the vehicle which has his seat set for the shorter driver. Thus, there are some deficiencies in placing memory actuation switches within the vehicle.

Moreover, and generally, known switches provided to an operator of a vehicle to actuate systems such as cruise control, or the position of a window, are somewhat difficult to use. In many cases, to operate the known switches efficiently a driver must direct attention from the road. This is, of course, undesirable. It would be desirable to provide switches which do not require the driver's attention to leave the road.

Moreover, in many known vehicle switching systems, it is difficult to precisely achieve a desired level. As one example, in cruise control systems the operator must manually adjust the speed through the accelerator pedal to reach a desired speed. The operator then actuates the cruise control system to enter this desired speed. This manual setting may sometimes result in the operator having some difficulty reaching a precise desired speed.

Single touch actuation of window settings are typically full up or full down. To reach an intermediate position, the operator has been required to hold the switch until the exact desired intermediate position is reached, and then release the switch. Again, this type of switch makes its somewhat difficult to reach a precise desired position.

SUMMARY OF THE INVENTION

In a disclosed embodiment of this invention, an interface system for setting vehicle control parameters prompts the driver through a series of settings upon entering the vehicle. The interface system may prompt the driver to set the position of the seats, mirrors, etc. The interface system may also be provided with a second, optional, set of prompts to position secondary characteristics such as interior lighting level, volume of audio system, etc.

In other features of this invention, an interface system is provided that is somewhat universal. The driver is provided with a key fob, or other device that stores and transmits the individual positions of the several control parameters desired by the driver. The driver may actuate the key fob when approaching, or entering, the vehicle. The control for the interface system captures the signals, and the control parameters are then adjusted to the drivers desired settings. This reduces the time necessary to set the parameters to those desired by the operator when entering a new vehicle, such as a rental car.

The key fob storing the driver's preferences may also be used without the interface system. The invention can be used to allow a vehicle to begin moving to preset memory positions even before the driver enters the car. This portion of the invention may replace, or supplement, vehicle mounted memory switches.

In other features of this invention, unique switches are disclosed which are more easy to utilize, and are less likely to distract the driver's attention from the road. In one embodiment, a rotary switch is mounted directly on the rim of the steering wheel. The driver need only rotate the rotary switch which is adjacent to the location of the driver's hand. Positioning the rotary switch on the steering wheel rim thus allows an operator to easily adjust control parameters. The switch has benefits both within, and separate from, the above described interface system.

A second inventive switch type allows an operator to touch a position on the switch and easily and accurately set a control parameter. This touch switch is provided by a resistance bar potentiometer, or a standard touch screen type element, or other position sensing elements.

In one application, the touch switch is utilized to allow an operator to set the desired speed for a cruise control system. A speedometer is provided with the touch element. An operator touches an area on the touch element corresponding to the desired speed. A signal is sent to move the vehicle to the speed corresponding to the location where the operator has touched the screen. This allows the operator to very precisely set the desired speed. This is an improvement over the prior art that required manual speed adjustment through the accelerator to reach a desired speed.

A second application of this type switch, is disclosed for controlling a parameter, such as the portion of a window. This allows the operator to quickly and accurately select an intermediate position between the full up full down positions for the window.

This touch switch can also be utilized to provide control sequentially for a number of different applications. A second switch can be provided adjacent to the touch switch wherein the second switch can be actuated to change the parameter which is to be controlled by the touch switch. In this way, a single touch switch is able to control several different vehicle control parameters.

In the disclosed switches, the movement to the specific control parameter may be ramped. Thus, if an operator inadvertently actuates a switch, it does not result in, for example, the vehicle rapidly increasing its speed up to an inadvertently set high speed.

These and other features of the present invention can be best understood from the following specification and drawings, of which the following is a brief description.

BRIEF DESCRIPTION OF THE DRAWINGS

FIG. 1A is a schematic view of an interface system incorporating the present invention.

FIG. 1B is a detail of a switch shown in FIG. 1A.

FIG. 1C is a cross sectional view through a portion of the FIG. 1b switch.

FIG. 1D is a cross-sectional view showing another switch embodiment.

FIG. 2A shows a first screen according to one aspect of the present invention.

FIG. 2B shows a screen subsequent to that shown in FIG. 2a.

FIG. 3 shows a switching system which may be a part of the present invention.

FIG. 4 shows a switching system utilized for another application.

DETAILED DESCRIPTION OF THE PREFERRED EMBODIMENTS

FIG. 1A shows a vehicle based system 20 incorporating a display 22 that is at least partially reconfigurable. Thus, the display 22 may be a LCD, LED or other type reconfigurable display to carry changing information. A speedometer portion 24 may include a touch screen portion. This portion may or may not be permanent, and may or may not be reconfigurable. The remainder of display 22 is preferably reconfigurable. Moreover, the entire display 22 including the speedometer could be made reconfigurable. A control 26 communicates with the display 22 and also communicates signals to and from components on a vehicle. The control is operable to send signals to adjust the position of vehicle components, and the operation levels of vehicle systems, such as temperature, etc.

Display 22 is shown displaying a prompt 28 to adjust the location of a vehicle seat, a prompt 30 to adjust the volume of the radio, and prompts 32 and 34 to adjust the position of side and rear mirrors. It should be understood that other prompts may be included, and those specifically disclosed here are for illustration purposes. In FIG. 1A, the prompt 28 is shown highlighted. Upon entry into a vehicle, control 26 may sequentially highlight the prompts 28, 30, 32, 34 such as shown in FIG. 1A. The prompts remain lit until an operator adjusts the highlighted parameter, and enters the new setting. The control then highlights the next prompt. In this way, an operator entering the vehicle is provided the opportunity to adjust the position of the seats, the mirrors, etc.

In the prior art, no such prompting was provided. In the past, an operator may have entered a new car with which the driver is unfamiliar and driven for a number of miles before recognizing that one of the components should be repositioned. It would be desirable to do all required positioning prior to beginning to drive the car.

In one optional feature, a key fob 35, or other signalling device, may be provided with a memory and an actuation or set button for communicating with control 26 through a receiver 36. If the driver interface system is standard on vehicles, then a rental car could be provided with a receiver 36, and a driver may carry an individual key fob 35 that stores the driver's individual selections for the various control parameters. By actuating the key fob when approaching a new car, the driver is able to send a signal to the control 26 that will begin to move components to the desired position even before the driver reaches the car.

A driver who has set the individual preferences within the vehicle may actuate the memory button on key fob 35, which then moves the key fob 35 into a learning mode. Information may then be communicated from the control 26 to the key fob such that the key fob can capture the settings set by the individual operator. Again, the specific components that would be necessary to achieve this function are well within the skill of a worker in the art. With such a preset key fob, a user of a vehicle will be able to begin moving the vehicle components to preset preferences when approaching the vehicle. This provides a more convenient way of achieving memory positions for drivers who are frequently moving a single car between two positions. As an example, if two individuals often use the same car, but are at opposite extremes at height, this system will allow the taller individual to begin moving the seat to a desired rearward position before entering the vehicle and as approaching the vehicle. In this way, the adjustment of the vehicle components may be done more quickly, efficiently, and comfortably.

The use of this key fob is optional. The main feature of the interface aspect of the invention is provide to the driver with prompts for the position and level of vehicle control parameters. The operator is then provided the opportunity to adjust those parameters. A switch is generally required to adjust the parameters. Steering wheel 37 is shown mounting an inventive rotary switch 38 on its rim 37.

While electrical switches are disclosed in this application, it should be understood that optical fiber signalling, radio frequency signalling, or other non-electrical wire type switching can be utilized with the inventive switch.

As shown in FIG. 1B, rim 37 includes a switch 38. Switch 38 is shown as a rotating switch. By rotating the rotary switch, a signal to adjust vehicle components can be sent.

As shown in FIG. 1C, switch 38 may rotate with electrical contacts 38C that moves along an electrical contact 39. The contact 39 may be mounted on a base or core 41 within the hub 37. Other contacts 43 may be used to select a system to be controlled by the switch. In this way, a signal is sent to the control 26 that is indicative of the amount of movement of the switch 38. The necessary controls and electrical structure for the contacts 38C, 39 and 43 are well within the skill of a worker in the art, and the illustrated structure is shown only as an example. The function of the switch can be to provide digital, analog, or any other switching feedback. As can be seen from FIG. 1C, the switch 38 rotates about the core 41 such that the switch generally rotates about the circumfrence of the wheel 37. That is, at the location where the switch 38 is mounted, the circumfrence is generally perpendicular to the plane in which the switch 38 is rotating. It is the positioning of the switch on the rim 37 which is inventive in this application. By positioning the switch directly on the rim, and making it rotate about the rim, the present invention provides a switch which is easily reached and actuated by an operator, without diverting the operator's attention from the road.

FIG. 1D shows another feature in which a switch 80 includes a rotating switch portion 82 as in the prior embodiment. An inner contact area 84 has an contact face 85 facing a contact member 86. Contact member 86 has a contact face 87 facing contact face 85. A spring 88 biases contact face 85 out of contact with face 87. When an operator wishes to make a momentary contact as to send a signal to control a vehicle function, member 82 is moved axially towards member 86 against the force of spring 88. Contact face 85 is brought into contact with contact face 87, and a signal is sent. The connections, etc., necessary to achieve such a signal are well within the skill of a worker in the art.

Again, the above-described switch embodiments may be electrical, or may be other type signalling devices. Moreover, many switching functions can be controlled with a single switch. As is known in the field of switches, plural contacts having variable resistance along their face can be utilized with these embodiments. Again, it is the placement of the switch at the particular location which is the inventive aspect of these type switches.

Also, while particular switches are disclosed in combination with the inventive control parameters of this application, it should be understood that other standard switches can also be utilized to select the control parameters in the parameter selection aspects of this application. The inventive switches are disclosed as presently preferred embodiments, however, other types of switches, including standard known switches can also be utilized.

FIG. 2A shows a set of primary vehicle position prompts 40 on the reconfigurable display. The prompts shown in FIGS. 2A and 2B differ from those shown in FIG. 1A, and show another alternative. The prompts may initially highlight the position 42 for the location of a seat between forward and rear positions. In addition, an instruction prompt 44 may be displayed to tell the operator to adjust the wheel switch (38) to adjust the seat position. The operator may also be provided with switches that allow entry of a new selected position 46, the setting of a memory 47, and also request that the display move to a secondary screen 48. Switches 46, 47, 48 could be standard switches, or could be touch screen type switches. As shown at 50, after setting parameter 42, screen 40 may move to the positioning of the rear view mirror and the side view mirror sequentially. Switch 38, or any other switch, may be operable to sequentially adjust ends of these parameters. Appropriate controls would receive the signal from switch 38 as instructions to change the particular parameter which is highlighted at the time.

The prompts may be such as shown in FIG. 2A, wherein only one of the prompts is displayed fully at one time, or they could all be displayed at one time as shown in FIG. 1A. The exact details are well within the ability of a worker of ordinary skill in the art, and many modifications would be apparent.

If the operator then requests the secondary screen, a screen 52 as shown in FIG. 2B is then brought up. The secondary features may include the volume 54 of the sound system, the lighting level 56 for the interior of the vehicle, and the temperature 58 of the vehicle. An enter button 46, and memory button 47 may be placed on the screen to allow the operator to enter any position after setting.

As shown in FIG. 3, the speedometer 24 can be provided with a touch screen portion 60. This allows selection of the speed as for use in a cruise control system. As shown, a desired speed has been touched at 62 and is thus highlighted. Control 26 will take this as an input. As shown, a digital readout may also be provided such that the selected speed is shown. Further, the standard resume switch 66, may be provided for resuming the prior selected speed in the event the system has moved away from the cruise speed, as when the brakes are applied.

The screen 60 may be a touch screen-type element wherein a fine grid of electrical controls is provided such that the operator has the ability to select within one to two miles per hour. Alternatively, a resistance bar potentiometer wherein the position of the contact is sensed due to the resistance through the element may be substituted. Either type element is technically known in and of itself; it is the application of such elements in this type switch which is inventive. Moreover, the basic inventive concept extends to other position sensors incorporated into such switching systems. Among the other types of known sensors are optical devices, capacitors, inductive signalling devices, wave bounce devices, obstructive devices, etc.

As shown in FIG. 4, a switch 68 may be provided with a touch element 70, which may be a resistance bar or a touch screen, or other position sensor element. As shown, a central position 72 has been touched and highlighted. Switch 68 may be associated with a vehicle window positioning control. Typically, vehicle window positioning controls only provide full up or full down positions with a single touch. To select an intermediate position, the operator must hold the button and then release it at the desired location. With applicant's invention, the operator may touch a desired intermediate position such as position 72. The control then drives the window to the intermediate position.

As shown, a second switch 74 may be associated with the switch 68. The second switch 74 is a function switch that allows one to change the function that is to be controlled by the main touch switch 68. Thus, as an example, switch 68 could be utilized to control radio volume, temperature, cruise control speed, etc. Switch 68 can be provided individually without the secondary button 74 to control a single component. It should also be understood that a plurality of switches 68 could be provided with each of the switches associated with a particular component, such as one switch 68 for each of the four windows typically found in a vehicle.

Further, single touch switches 75 and 76 can be placed adjacent the extreme ends of touch element 70. The switches 75 and 76 can provide a single touch movement to the extreme for the component which is controlled by the switch 68. That is, rather than selecting an intermediate position as by the touch element 70, occasionally it may be desired to have the component moved immediately to one extreme or the other. The switches 75 and 76 allow this movement to be selected and achieved. Again, the switches are connected with known structure to be capable of driving the particular component.

The switches shown in FIGS. 3 and 4 are preferably provided with a surface covering that provides good tactile contact. This ensures that the operator's finger is unlikely to slip when pressing against the touch element 60 or 70.

The controls necessary for achieving the above-described functions may all be provided with standard controllers and appropriate software. It is the unique functions and applications provided by the interface system control which are unique, and not the control structure itself.

However, the switches 38 and the switch system shown FIGS. 3 and 4 are unique. These switches have applications outside of the interface system 20 such as shown in FIGS. 1A, 2A and 2B. Moreover, although only the inventive switches are shown being utilized with the interface system, the interface system can incorporate other type switches.

Preferred embodiments of the present invention have been disclosed. However, a worker of ordinary skill in the art would recognize that certain modifications come within the scope of this invention. For that reason, the following claims should be studied to determine the true scope and content of this invention.

We claim:

1. A control system for a vehicle comprising:

a display to convey information to an operator of a vehicle;

a controller for said display, said controller storing a list of parameters to be set, said controller being operable to display prompts to an operator to set levels for each of said parameters on said display, said parameters including at least mirror and seat positions, and said prompts requesting the operator to adjust said mirror and seat positions without requiring the operator to request the prompts be displayed;

a switching system operable by an operator to set levels for said parameters; and said control communicating with components on the vehicle such that said control can move the components to the set level.

2. A system as recited in claim 1, wherein said prompts include a first set of primary prompts including at least seat position and mirror position.

3. A system as recited in claim 2, wherein a secondary set of prompts may also be selected by an operator, said secondary set of prompts including volume of an audio system and temperature.

4. A system as recited in claim 1, wherein said switching system includes a rotary switch mounted on a rim of a steering wheel.

5. A system as recited in claim 1, wherein said switching system includes a touch element allowing an operator to touch a location to set the desired level of a control parameter.

6. A system as recited in claim 1, wherein a separate remote transmitter is provided to an operator, said transmitter storing previously selected parameter settings for the operator, said transmitter being operable to communicate said settings to said controller, said controller moving the vehicle components to said settings upon receipt of said transmitted signals.

7. A method of operating a vehicle comprising the steps of:

(1) providing a display and a controller for said display, said controller being operable to display prompts to an operator to request an operator to set desired levels for several vehicle parameters, including at least seat and mirror positions, and providing a switching system to allow an operator to adjust the level of said parameters upon receiving said prompts, said controller being provided with the ability to then communicate said levels to the vehicle components and cause adjustment of vehicle components as necessary;

(2) identifying an entry into the vehicle, and then utilizing said control to display prompts requesting an operator to adjust the levels of said parameters;

(3) adjusting the levels of said parameters utilizing said switching system; and (4) sending a signal to actuate the vehicle components to the newly selected level.

8. A method as recited in claim 7, wherein said switching system includes a rotary switch mounted on a steering wheel hub of a vehicle, and the steps of adjusting the parameter levels include turning said switch on said hub.

9. A method as recited in claim 7, wherein said switching system includes a touch screen element which may be touched at a desired location for setting a parameter.

10. A method as recited in claim 7, wherein display of prompts of step (2) is made without requiring an operator to initiate a request for said display.

11. A switching system for a vehicle comprising:

a vehicle steering wheel having an outer rim, said rim defining a perimeter of said wheel and surrounding a rotational axis of said wheel; and a rotary switch mounted on said rim, said rotary switch being operable to rotate on said rim, said rotary switch rotating in a plane, and said perimeter being generally perpendicular to said plane at the location on said rim where said rotary switch is mounted, said switch including contact components such that rotation of said switch causes a signal to be sent from said switch.

12. A switching system as recited in claim 11, wherein said signal is an electrical signal.

13. A vehicle switching system comprising:

a single switch having extreme positions and a plurality of intermediate positions between said extreme positions;

said switch including a touch element such that when said element is touched by an operator between said extreme positions, a controller for said switch identifies the location between said extreme position which has been touched, said location being communicated to a controller for a vehicle component, and said controller adjusting the vehicle component to a level corresponding to said location; and said element being a speedometer display for a vehicle, and an operator may touch said speedometer display at a location corresponding to a desired speed, and a control for said speedometer communicating with a vehicle speed control, and adjusting vehicle speed to the desired speed.

14. A switch as recited in claim 13, wherein said touch element is a resistance bar potentiometer.

15. A switch as recited in claim 13, wherein said element is a touch screen.

16. A control system for a vehicle comprising:

a controller operable to communicate with vehicle components including at least a vehicle seat position, and adjust parameters of said components, including at least a vehicle seat position, said controller being operable for storing preselected positions including at least a desired seat position; and a signalling device which is portable and may be carried by an operator, said signalling device being operable to capture said preset settings from said control, and said signalling device being operable to send a signal to said controller communicating said settings, said controller communicating with said vehicle components upon receiving said signal from said signalling device to begin moving said components to said preset levels.

17. A control system as recited in claim 16, wherein said vehicle components also include the vehicle mirrors, and said controller is operable to communicate to adjust and store desired parameters of said vehicle mirrors.

18. A vehicle switching system comprising:

a single switch having extreme positions and a plurality of intermediate positions between said extreme positions:

said switch including a touch element such that when said element is touched by an operator between said extreme positions, a controller for said switch identifies the location between said extreme position which has been touched, said location being communicated to a controller for a vehicle component, and said controller adjusting the vehicle component to a level corresponding to said location; and said switch is provided for controlling a vehicle window.

\* \* \* \* \*